United States Patent [19]

Fink, Jr. et al.

[11] 4,048,659
[45] Sept. 13, 1977

[54] AUTOMATIC CASSETTE REPRODUCING APPARATUS

[75] Inventors: August A. Fink, Jr., Darien, Conn.; Noel J. Mackisoc, Newton, N.J.

[73] Assignee: August A. Fink, Jr., Darien, Conn.

[21] Appl. No.: 664,088

[22] Filed: Mar. 5, 1976

Related U.S. Application Data

[63] Continuation of Ser. No. 473,357, May 28, 1974, abandoned.

[51] Int. Cl.² ............................................. G11B 15/18
[52] U.S. Cl. ...................................... 360/72; 360/12; 360/73; 179/100.1 PS
[58] Field of Search .................... 360/72, 73, 74, 12; 179/100.1 PS, 100.1 MD

[56] References Cited

U.S. PATENT DOCUMENTS

| | | | |
|---|---|---|---|
| 2,396,409 | 3/1946 | Berzer | 179/100.1 PS |
| 3,171,902 | 3/1965 | Jones et al. | 360/74 |
| 3,587,180 | 6/1971 | Richt | 360/74 |
| 3,601,556 | 8/1971 | Copper, Jr. | 179/100.1 PS |
| 3,668,648 | 6/1972 | Yoshikawa | 360/12 |
| 3,804,993 | 4/1974 | Honnaud | 360/72 |
| 3,987,484 | 10/1976 | Bosche | 360/72 |

*Primary Examiner*—James W. Moffitt
*Attorney, Agent, or Firm*—Kane, Dalsimer, Kane, Sullivan and Kurucz

[57] ABSTRACT

An automatic cassette reproducing apparatus and the method for its use with a cassette tape with an audio program and a control signal thereon. The apparatus includes a housing adapted to receive a cassette and cassette tape transport structure within the housing for engagement with and transportation of the tape. The transport structure in a first mode is adapted to advance the tape at a normal speed at which the audio program thereon can be transmitted to a listener. The transport structure is adapted to be shifted to a second mode to advance the tape at a faster speed to a later portion of the audio program. A lock is in the housing to automatically retain the transport structure in one of the modes for a predetermined length of time. Finally, controls are provided in the housing to automatically activate and deactivate the lock in response to the control signal on the tape.

7 Claims, 12 Drawing Figures

AUTOMATIC CASSETTE REPRODUCING APPARATUS

This is a continuation of application Ser. No. 473,357, filed May 28, 1974, now abandoned.

BACKGROUND OF THE INVENTION

A concept has developed in teaching and in presentation of audio programs for informative purposes which facilitates the location and identification at various portions of the program without the necessity of having to reproduce and listen to the entire program. It can be readily envisioned how difficult it is to try and locate one portion of an entire taped presentation or written article without any adequate means for determining where in the transcript the desirable portion might be. This is often true when dealing with a situation where time is of the essence or the listener or reader is only interested in one small portion of a presentation.

Audio programs of information and for teaching purposes have been found to be very useful in the professional world. For example, doctors are constantly interested in the latest documentation in their field and are constantly looking for ways to be kept up-to-the-minute on latest developments. Often they have limited time in which to read or listen to the latest informative material and are readily receptive to means for recognizing and identifying segments or portions of a program with which they are primarily concerned.

One system to facilitate the presentation and acceptance of program material of this type is a system which has been effectively used with written presentations. A brief caption or synopsis is presented before a longer written portion of the program so that the reader may read the synopsis at a glance and determine whether or not he is interested in reading the longer more detailed portion which follows. Periodically a synopsis appears during the written presentation and the reader can skim through the presentation by reading each synopsis thereby getting a general picture of the content of the document. Additionally, should any synopsis interest him specifically, he can read the following more detailed presentation after the synopsis to get a fuller picture. In this manner, a reader, such as a doctor, can skim entire articles in a short period of time to find points of interest which can be read in greater detail.

It is envisioned that this type of synopsis approach would be helpful in connection with recorded presentations where the listener could skim the recorded tape presentation by merely listening to a series of brief synopsis periodically positioned along the tape in order to skim the recorded program and, if desired, to choose particular portions of the program for detailed listening. There is no known system for recorded presentations which employs synopses or abstracts to segment the recorded portion so that the entire tape may be skimmed in a rather short period of time and various portions of the entire program can be pin-pointed for purposes of more detailed study should the listener so desire. Naturally, for effective operation, the system must be one which identifies the synopsis or abstract portions from the longer more detailed portions and one which controls the presentation to the listener so that he is aware of the differentiation between abstracts and detailed portions of the tape and is restricted in the manner in which he listens to the taped program.

SUMMARY OF THE INVENTION

With the above thoughts in mind, it is among the primary objectives of the present invention to provide an automatic cassette reproducing apparatus which is designed to handle a taped program having periodic abstract portions and longer text portions in between. The system is designed so that the listener is locked into a normal reproducing speed for a desired portion of the tape program. For example, the program can be locked into the periodic abstract portions so that the listener is required to remain at the normal speed for the abstract portions and is free to advance the tape at a more rapid speed in between the abstracts when the detailed program material is being received. In this manner, the listener is able to skim a tape presentation by merely listening to the abstracts thereby gaining a general understanding of the tape material. Should an abstract be of particular interest, he can retain the tape at the normal listening speed for the more detailed material with which that abstract is concerned and which follows the abstract directly. On the other hand, if the abstract contains material of which the listener has no particular interest, he can advance the tape at a much more rapid speed thereby reducing the playing time for the tape. Additionally, automatic means are provided to lock the apparatus in the normal play position during a presentation of a certain portion of the tape such as an abstract and an audio signal is provided to signal the end of a locked condition so that the listener is aware of the time at which he may advance the tape at a more rapid rate.

The automatic cassette reproducing apparatus and the method of its use as presented herein is adaptable for use in recorded presentations which incorporate periodic abstracts or express portions followed by more detailed portions of the program. It is of particular use in the professional world where informative or teaching presentations are made and it is desirable to skim the presentations to locate areas of particular interest while still gaining a general understanding of the over-all content of the presentation. The time involved in covering the entire presentation is significantly reduced without detracting from the listener's ability to listen to a more detailed portion of any section of the tape depending upon specific interest engendered by an individual express stop portion of the tape.

The concept is readily adaptable to use with commerical presentations where it is desirable to lock the listener into the play mode for the duration of the presentation of a commerical. In this manner, the sponsor of a program can be guaranteed that the listener will be exposed to that part of the program containing his commerical messages.

In summary, an automatic cassette reproducing apparatus for use with a cassette tape with an audio program and a control signal thereon is provided. The apparatus includes the housing adapted to receive the cassette. A cassette tape transport means is within the housing for engagement with and transportation of the tape. The transport means in a first mode is adapted to advance the tape at a normal speed at which the audio program thereon can be transmitted to a listener and is adapted to be shifted to a second mode to advance the tape at a faster speed to a later portion of the audio program. Lock means is in the housing to automatically retain the transport means in one of the modes for a predetermined length of time. Finally, control means is in the housing to automatically activate and deactivate the lock means in response to the control signal on the tape.

With the above objectives, among others, in mind, reference is had to the attached drawings.

DESCRIPTION OF THE PREFERRED EMBODIMENT

Figure 6:
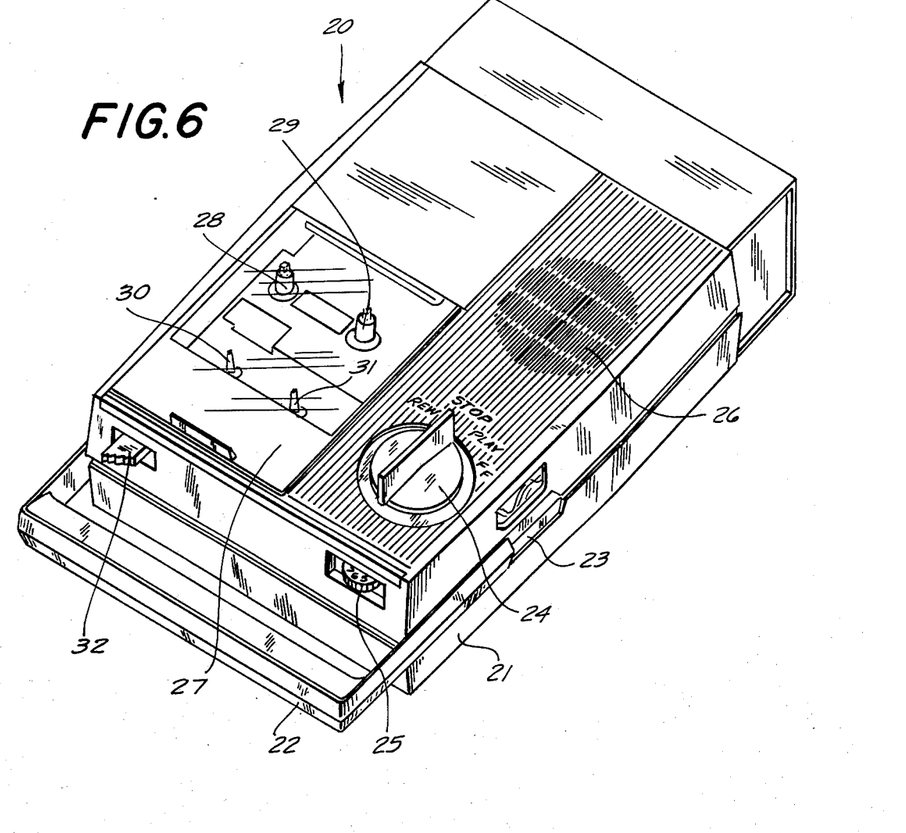
FIG. 6 is a perspective view of the automatic cassette reproducing apparatus of the invention.

The general configuration of the automatic cassette reproducing apparatus 20 is depicted in FIG. 6. Its outer casing 21 can be of a conventional material such as a plastic or metal and an appropriate handle 22 is supplied for carrying purposes. Handle 22 is slidable along slot 23 for a restricted distance to permit it to be reciprocated between a gripping position for carrying and a recessed position during use. A control knob 24 is positioned on the top of casing 21 and is shiftable between four positions. As shown in FIG. 6, it is in the stop position and is shiftable into the normal play position, a fast foward position and a rewind position. A volume control 25 is accessible on the exterior casing 21 for controlling the volume of the program being received from a tape which is normally projected through speaker 26 on casing 21.

A cassette compartment 27 is recessed in the casing and is covered by a door which may be opened to permit access to the interior of the cassette compartment. Appropriate spindles 28 and 29 are in the cassette compartment for receiving the cassette tape. Additionally, other appropriate engaging pins 30 and 31 are provided for engagement with the cassette and guidance to the tape in conventional fashion. A cassette eject button 32 is on the exterior of the casing 21 and extends within so that when it is shifted it will appropriately mechanically displace the cassette from the spindles on which it is mounted for ease of grasping and removal.

Figure 1:
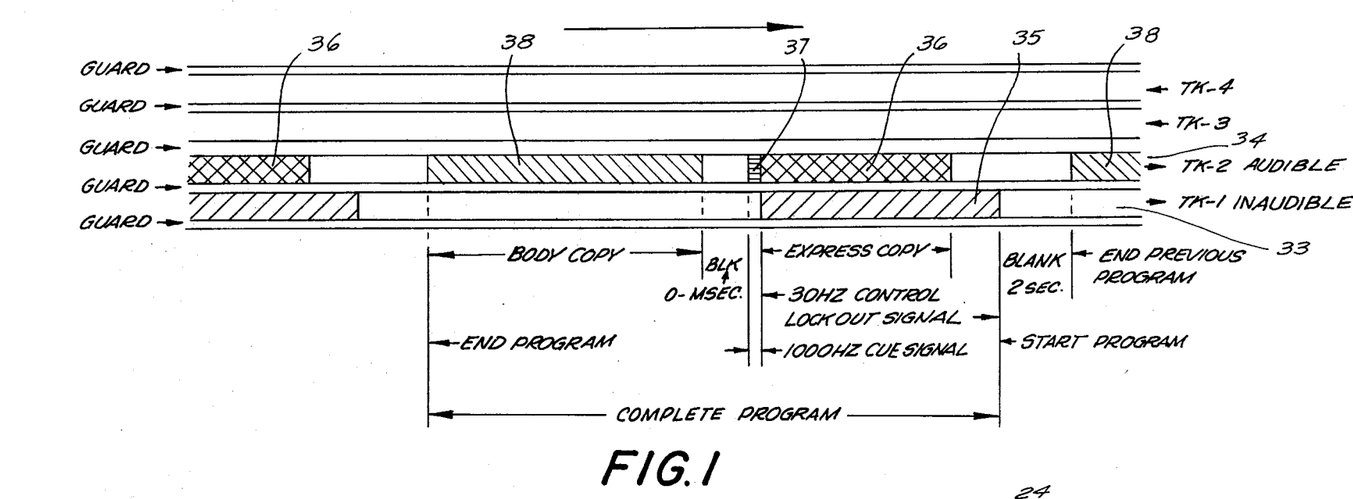
FIG. 1 is a schematic view of the tape employed in the apparatus of the invention.

Apparatus 20 is designed for use with a conventional cassette containing a four-track tape thereon. As shown in FIG. 1, the tape has signals on two of its four tracks. As shown, the first two adjacent tracks identified as tracks 33 and 34 contain the inaudible and audible signals respectively. The remaining two tracks are maintained in clear condition. An arrow in FIG. 1 shows the direction of travel of the tape program. Track 33 contains the inaudible control signals 35 at periodic intervals for predetermined lengths of time. For example, each signal 35 can be a 30 hertz control lock-out signal. Control signal 35 as will be discussed in detail below locks the apparatus 20 at the normal play speed thereby preventing the device from being shifted into a fast forward condition while signal 35 is present on the tape. Track 34 includes the tape audible program which is made up of express copy or abstract portions 36 each followed by an audible signal 37 of short duration to signal the end of the abstract 36 and accordingly the end of the presence of inaudible control signal 35. After a suitable blank interval a body tape portion 38 is provided with the detailed audio program of which express portion 37 is an abstract. Thereafter, a blank interval is provided and then the next express or abstract portion 36 is received.

The control signals 35 on the first track are positioned so that the locking control effect takes place shortly before an express abstract 36 appears on the second track. Between the end of a detailed program 38 and the beginning of the next control signal 35 is a blank of predetermined duration. It has been found that a two-second interval of minimum duration has been found to be effective for the present system.

As discussed above, control system 35 has been found to operate effectively at 25 to 30 hertz at −8 to −12 VU. The audio cue signal is approximately 1000 hertz at program level. The program level is approximately −4 VU average. It has been found preferable to have the express copy 36 and the body copy 38 of at least 30 seconds duration for facilitation of proper operation of the system. Naturally, the maximum program length is determined by the length of tape located in the cassette. It should also be kept in mind that short control signals of two seconds minimum duration may be used to return the player to the play mode without restricting a copy following on the tape. Furthermore, cue signals may be impressed as desired, at any point along the length of the tape.

The tape as shown in FIG. 1 is viewed from the oxide side and in the present context OVU equals 25 millimaxwells per mm. It has been found effective to have a tape velocity of 1.875 inches per second. Naturally, the arrangement of blanks versus program and signal portions can be varied within the context of the discussion above in order to provide the continuous audio program and control signal necessary for operation of the present method and apparatus. Modifications are readily apparent. For example, any portion of the tape may be restricted, that is, locked out of the fast forward mode by merely placing the 30 hertz tone on track 1 for the duration. Short tones may be used to signal an important segment, whereupon the player, if in fast forward, will go to the play mode, but will not be restricted once the tone ceases. Naturally, other conventional audible signal levels can be substituted for the 25-30 hertz tone without interfering with operation of the system.

The primary purpose of the cue tone 37 is to signal the listener that the restricted portion has passed and fast forward operation is again possible. However, these tones could be made to perform certain functions such as indexing or stopping the player.

It is also preferable on the program information express or body copy passed through a low frequency roll-off filter to remove all components below 125 hertz in order that they will not affect the operation of the control tone sensing circuits.

Figure 2:
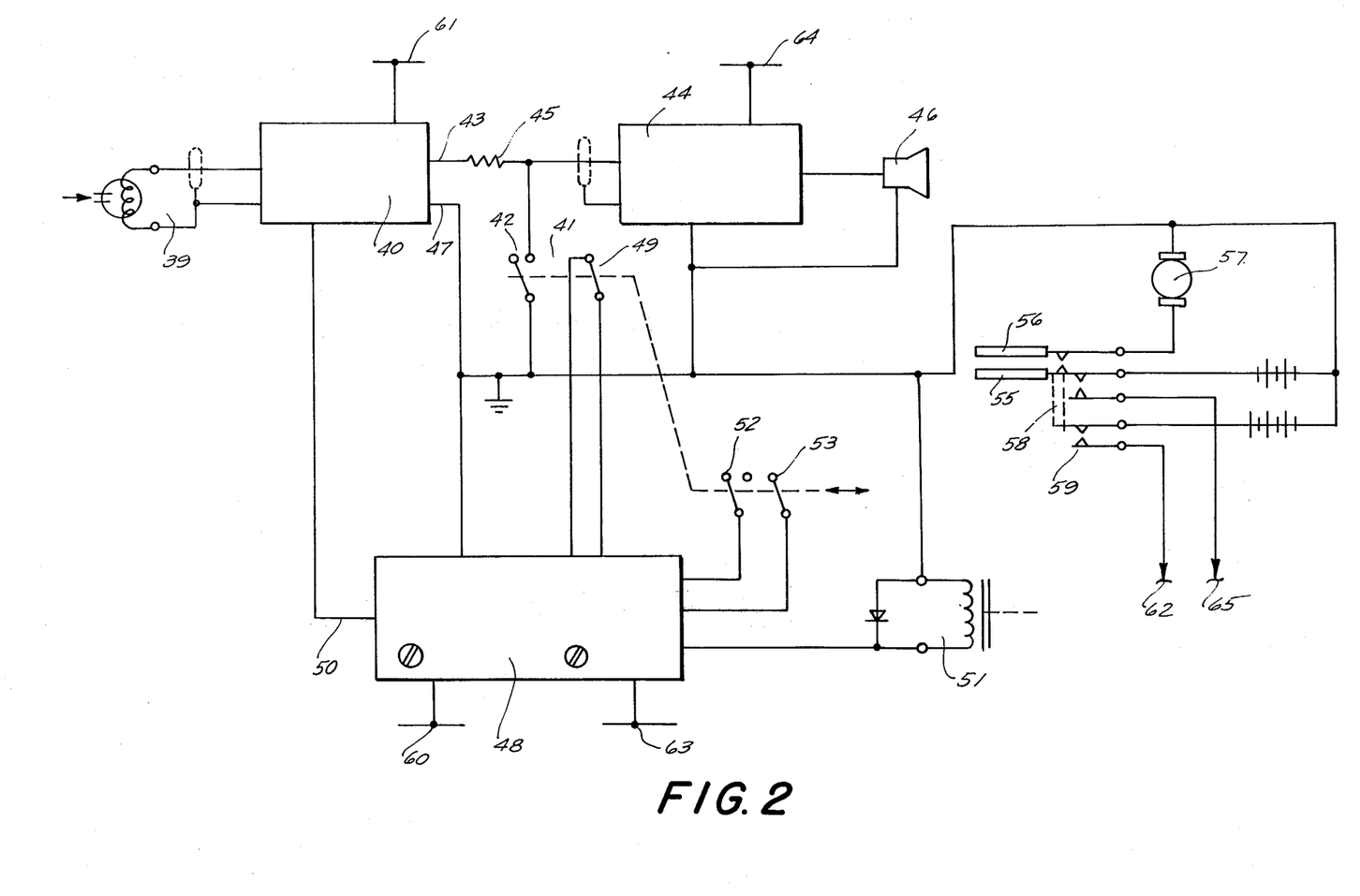
FIG. 2 is a block diagram of the apparatus of the invention

FIG. 2 shows the general electrical arrangement for apparatus 20. Reproducing head 39 is in direct contact with the cassette tape as it passes through the apparatus and picks up the signals thereon. In conventional fashion, head 39 is in contact with the magnetic tape. Signals, in the form of control and cue tones, or audio frequencies, previously recorded according to the formats discussed above will be sensed by head 39 and passed to the preamplifier assembly 40.

When the apparatus is in the play mode where the tape program is being reproduced at a speed for acceptance by the listener, the system will operate as follows. Preamplifier assembly 40 serves to increase the magnitude of the signals emitted by head 39, giving increased emphasis to frequencies at or around 30 hertz, and diminishing emphasis to frequencies above 300 hertz. Included in preamplifier assembly 40 is a volume adjusting control affecting only the connection to the power amplifier assembly.

Switch 41 is shown in the normal play, stop or rewind position. Contact set 42 is open and allows the preamplifier output 43 to pass to the power amplifier 44 through 4.7K resistor 45. Power amplifier assembly 44 increases the level and power sufficiently to operate loudspeaker 46 so that the audible portion is projected through speaker aperture 26 in casing 21.

Another output 47 of preamplifier assembly 40 precedes the volume control and is applied to control assembly 48. Here the signal is amplified and the unwanted frequency components removed. In the play position, all frequencies above 50 hertz are severely attenuated to elminate their affecting the remaining portion of the control circuitry. In the fast forward mode, attenuation occurs above 350 hertz for a typical conventional player unit. The selection is provided by the contacts 49 of switch 41.

Should a 30 hertz tone be present at the input to the control assembly 48 through connection 50, it is detected and converted to a DC voltage which energizes a relay within control assembly 48. That action serves to remove the actuating power to the pawl solenoid 51, thus preventing fast forward operation.

If the 30 hertz tone is not present, moving switch 41 to the right, affected by turning the control knob 24 on apparatus 20 causes contact sets 52 and 53 to close momentarily, thereby completing the required circuit to energize solenoid 51 long enough to release the latch pawl. A continued turning of control knob 24 places the player in fast forward mode.

When the system is in the fast forward mode, the magnetic tape remains in light contact with head 39 and traverses at approximately 5 to 10 times normal playing speed. Switch 41 would be to the right from the position shown in FIG. 2.

When a 30 hertz tone, multiplied by the increased speed to 150 to 350 hertz is sensed by head 39, it is detected and converted to a DC voltage by the control assembly 48, and in the same unit, serves to supply a power pulse to solenoid 51. The momentary energizing of solenoid 51 trips the latching pawl whereupon mechanical power acts to return the player to play mode.

If the 30 hertz tone continues, the player will lock out the fast forward capability as described above.

During the time that the player is in the fast forward mode, the preamplifier signal to the power amplifier 44 is interrupted via the short through the switch contacts 42 to ground. This eliminates the squealing caused by the tape passing the head at high speed.

Power to operate the various circuits, drive motor and solenoid is obtained from a self-contained battery pack, or from a suitable external power source. Switch 54 controls the flow of power from the −6 volt and +9 volt batteries.

When control knob 24 on apparatus 20 is in stop position, all circuits are disconnected as shown. Mechanical depression of the lower actuator 55 toward the upper one 56 for rewind purposes supplies −6 volts to the drive motor 57 only. For the reverse case, that is for play and fast forward, −6 volts is applied to the drive motor 57 and to the electronic circuits via pressure being applied to upper actuator 56. An insulating length 58 causes the lowermost contact set 59 to close, thereby routing +9 volts to the electronic circuits. Contacts 60, 61 and 62 are connected to the +9 volt source. In contrast, connections 63, 64 and 65 are connected to the −6 volt source.

Figure 3:
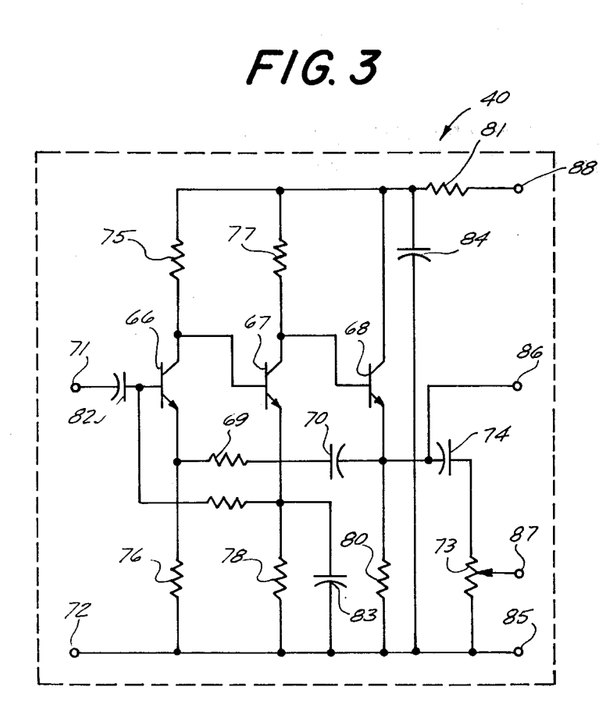
FIG. 3 is a schematic view of the preamplifier assembly circuit portion of the apparatus.

FIG. 3 depicts the details of preamplifier assembly 40. The preamplifier consists of three stages, stage 66, 67 and 68 in a conventional feedback configuration. The feedback loop, consisting of resistor 69 and capacitor 70 serves to increase the net gain as the input frequency, applies across contacts 71 and 72, decreases, with maximum gain available at 30 hertz. Beyond 125 hertz, this network produces the required equalization for cassette program material, that is, the gain is diminished as the frequency increases.

A volume control 73 is set by the listener for a convenient sound level from the loundspeaker. Knob 25 is connected directly to the interior volume control structure 73.

Capacitor 74 serves to diminish the passage of frequencies below 125 hertz, thus elminating cross modulation between the 30 hertz tone and program information at the power amplifier 44.

As shown in FIG. 3, resistor 75 is a collector load resistor for phase 66 and has a value of 68,000 ohms. Resistor 76 is an emitter load resistor for phase 66 and has a value of 100 ohms. Resistor 77 is a collector load resistor for phase 67 and has value of 6200 ohms. Resistor 78 is an emitter load resistor for phase 67 and has a value of 1600 ohms. Resistor 79 is a base biasing resistor for phase 66 and has a value of 100K ohms. Resistor 80 is an emitter load resistor for phase 68 and has a value of 3900 ohms.

The feedback loop resistor 69 which sets the minimum gain above 300 hertz has a value of 82,000 ohms. The volume adjusting potentiometer 73 has a variable resistance in the area of 10,000 ohms. Resistor 81 is utilized in power supply decoupling and has a value of 1100 ohms.

Capacitor 82 is utilized in input DC blocking and has a value of 1.5 μfd. Capacitor 83 functions as an emitter bypass for phase 67 and provides increased gain at frequencies below 50 hertz. It has a value of 150 μfd. Capacitor 70, as discussed above, is used in feedback reactance and provides increase in gain at frequencies below 300 hertz. It has a value of 4.7 nfd. Capacitor 74 is utilized in output DC blocking and diminishes the output of frequencies below 150 hertz. It has a value of 100 nfd.

Capacitor 84 is utilized in the power supply bypass and has a value of 150 μfd.

As discussed above, the three phases 66, 67 and 68 are part of a three phase transistor which may be of the NPN 2N5172 type where phase 66 is the first amplifying stage, phase 67 is the second amplifying stage, and phase 68 is the emitter follower stage.

Various connections depicted in FIG. 3 are as follows. Terminal 71 is the input signal terminal where the input signal is applied between points 71 and 72, the ground. Points 72 and 85 are connected to ground. Point 86 is the direct signal output connection. Point 87 is the adjustable signal output terminal and point 88 is the power supply terminal which is +9 volts applied between point 88 positive and point 85 negative.

Figure 4:
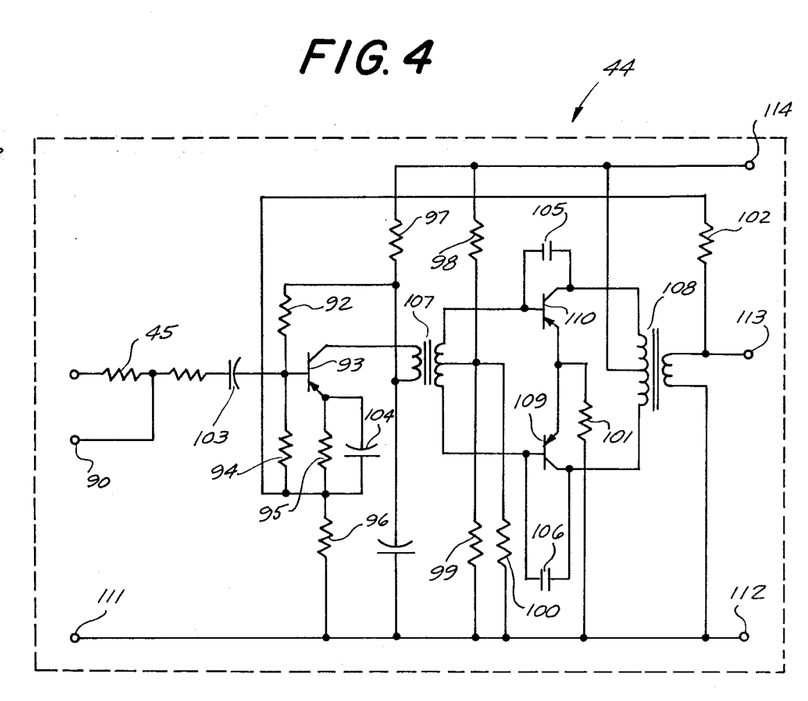
FIG. 4 is a schematic view of the power amplifier assembly circuit portion of the apparatus.

FIG. 4 shows the details of the power amplifier assembly 44. Specifically, resistor 89 is at the preamplifier termination where point 90 is grounded during fast forward operation. Resistor 45 is then located in the main frame assembly. It has a value of 4700 ohms. Resistor 91 has a value of 1000 ohms and functions as in input signal limitation. Resistor 92 is a base bias divider resistor of 3300 ohms for transistor 93. The 2SB175 transistor is acceptable for transistor 93 and is used as an amplifier driver stage. Resistor 93 has a value of 2200 ohms and is a base bias divider and emitter to base feedback loop for phase 93. Resistor 95 has a value of 150 ohms and acts as an emitter bias resistor for phase 93. Resistor 96 has a value of 12 ohms and acts as an emitter load resistor and is part of the feedback loop for phase 93.

Resistor 97 has a value of 100 ohms and functions for driver stage power supply decoupling. Resistor 98 has a value of 2700 ohms and functions at an output stage base bias divider. Similarly, resistor 99 has a value of 150 ohms and also functions as an output stage base bias divider. Varistor 100 has a value of 150 ohms and functions as an output stage base bias thermal regulator. Resistor 101 has a value of 4.7 ohms and functions as an output stage emitter bias stabilizer. Finally, resistor 102 has a value of 390 ohms and operates in the signal feedback loop.

Turning to consideration of the capacitors in power amplifier assembly 44, capacitor 103 has a value of 10 μfd and is a DC blocking and coupling capacitor. Capacitor 104 is a 47 μfd capacitor and functions as an emitter bypass for phase 93. Capacitors 105 and 106 have values of 4.7 nfd respectively and are parasitic suppressors in the system.

There are two transformers 107 and 108 in the system. Transformer 107 functions in driver-output coupling and phase splitting while transformer 108 functions in output-loudspeaker coupling.

Two additional transistors in the system are transistors 109 and 110 which are 2SB178 transistors and function as push-pull, "class B" output stage elements. Transistor 93 is of the "class A" type.

Turning to consideration of the various contact points in power amplifier assembly 44, point 90 is the signal input terminal and points 111 and 112 are connections to ground. Point 113 is the signal output terminal and finally point 144 is the power supply terminal to −6VDC.

Figure 5:
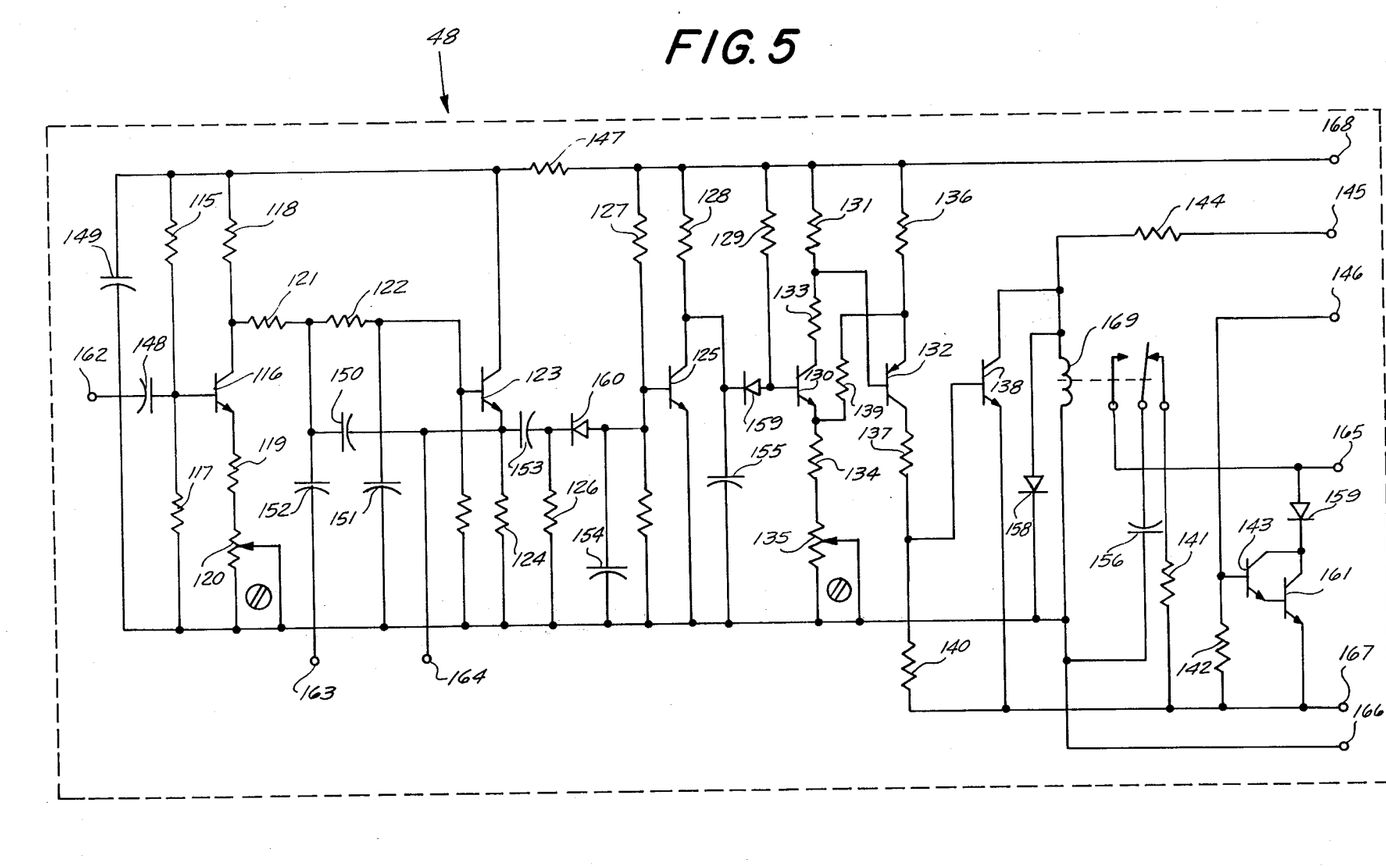
FIG. 5 is a schematic view of the control assembly circuit portion of the apparatus.

FIG. 5 is a detailed drawing of the components of the control assembly shown in the "no signal" condition. The various components as depicted in an operative embodiment would be as follows.

Resistor 115 is a 200K ohm resistor which functions as a base bias divider for transistor 116. Resistor 117 which is a 33,000 ohm resistor is also a base bias divider for transistor 116. Resistor 118 is a 3,000 ohm resistor which acts as a collector load for transistor 116. Resistor 119 is a 120 ohm resistor which operates as an emitter load resistor for transistor 116. Resistor 120 is a variable resistor of approximately 500 ohms which operates as an emitter load and gain adjustment for transistor 116.

Resistors 121 and 122 are 12,000 ohms resistors which form a base bias and resistor component of a low pass filter from transistor 123.

Resistor 124 is a 2700 ohm resistor which functions as an emitter load for transistor 123. Resistor 126 is a 3900 ohm resistor which is a DC and AC signal developing resistor. Resistor 127 is a 6200 ohm resistor which functions as a base biasing element for transistor 123. Resistor 128 is a 100K ohm resistor which functions as a collector load and delay network charging source element for transistor 125.

Resistor 129 is a 1 megohm resistor which functions as a base current source for transistor 130. Resistor 131 is an 8200 ohm resistor which functions as a collector load for transistor 130 and a base clamp for transistor 132. Resistor 133 is a 15,000 ohm resistor which functions as a collector load for transistor 130 and as a base limiting element for transistor 132. Resistor 134 is a 1200 ohm resistor which functions as an emitter load for transistor 130.

Resistor 135 is a variable resistor in the range of 10,000 ohms and functions as a trigger threshold adjustment. Resistor 136 is a 180 ohm resistor which functions as an emitter load resistor for transistor 132. Resistor 137 is a 4700 ohm resistor which functions as a collector load for transistor 132 and a base limiter for transistor 138. Resistor 139 is a 2700 ohm resistor which functions as a feedback loop.

Resistor 140 is a 4700 ohm resistor which functions as a collector load for transistor 132 as well as a base clamp for resistor 138. Resistor 141 is a 100 ohm resistor which functions in limiting the charge current.

Resistor 142 is a 3000 ohm resistor which operates as a base clamp for transistor 143. Resistor 144 is a 2400 ohm resistor which functions as a base bias resistor for transistor 143 when contacts 145 and 146 are closed. Finally, resistor 147 which in the embodiment is a 330 ohm resistor functions as a power supply decoupling element for transistors 116 and 123.

Turning to capacitors employed in the control assembly 48, capacitor 148 is a signal coupling and DC blocking element of 470 nfd value. Capacitor 149 functions as a power supply bypass and has a value of 16 μfd. Capacitor 150 functions as a series reactance in an active filter loop (350 hertz). It has a value of 82 nfd. Capacitor 151 has a value of 82 nfd and functions as a shut reactance in an active filter loop. Capacitor 152 is an 820 nfd capacitor which functions as a series reactance in te active filter loop (30 hertz).

Capacitor 153 is a 1.5 μfd capacitor which functions as a DC blocking and signal coupling. Capacitor 154 is a 5 μfd capacitor which has an integrating function. Capacitor 155 is a 560 nfd time delay capacitor. Capacitor 156 is a 5000 μfd energy storage capacitor.

Turning to consideration of the diodes, there are four diodes in the circuitry shown in FIG. 5. Diode 157 is a 1N914 diode which functions as an isolation element. Diode 158 is a 1N4385 diode which acts as a reverse EMF suppressor. Diode 159 is a 1N4385 diode which operates as an isolation element and diode 160 is a 1N914 diode which functions as a rectifier.

The transistors depicted in FIG. 5 are as follows in the described representative example. Transistor 116 is a 2N5172 transistor which functions as part of the first amplifying stage. Transistor 123 is a 2N5172 transistor which operates as a low pass filter active element. Transistor 125 is a 2N3568 transistor which operates as a switch clamp. Transistor 130 is a 2N5172 transistor which is part of a Schmitt trigger. Transistor 132 is a 2N3638A transistor which is also part of a Schmitt trigger arrangement. Transistor 138 is a 2N3568 transistor which operates as a relay driver. Transistor 143 is a 2N3568 transistor which operates as a beta multiplier. Finally, transistor 161 is a 2N5293 transistor which functions as a solenoid driver.

The various contact points depicted in FIG. 5 are connected as follows. Point 162 is the signal input terminal and points 163 and 164 are shorted for 30 hertz and are open for 350 hertz filter operation. Points 145 and 146 are shorted to engage the solenoid through transistor 161. Point 165 is the solenoid output terminal and point 166 goes to ground. Point 167 is the connection to the −6 VDC power supply and point 168 is the connection to the +9 VDC power supply.

Naturally, substitute components for the above can be readily envisioned in a well known conventional manner.

The general theory of operation of the components of the system as described above in detail takes the following form. The preamplifier assembly 40 consists of three stages including transistors 66, 67 and 68, in a conventional feedback configuration. The feedback loop, consisting of resistor 69 and capacitor 70, serves to increase the net gain as the input frequency, applied across points 71 and 72, decreases, with maximum gain available at 30 hertz. Beyond 125 hertz, this network produces the required equalization for cassette program material, that is, the gain is diminished as the frequency increases.

A volume adjusting control, resistor 73, is set by the listener for a convenient sound level from the loudspeaker.

Capacitor 74 serves to diminish the passage of frequencies below 125 hertz, thus eliminating cross modulation between the 30 hertz tone and program information at the power amplifier.

The circuitry of the power amplifier assembly 44 is of a conventional type, being a classic class B power amplifier preceded by a class A driver stage. The circuit operates from −6 volts and produces approximately 500 milliwatts of audio frequency power.

Control assembly 48 is more complex and detailed in operation. The uncontrolled preamplifier output from point 86 is applied to the first amplifier stage 116 through point 162. The gain at this stage is adjustable from 2 to 10 by resistor 120. In this manner, compensation is provided for head and preamplifier tolerances. The output is directly coupled to the low pass filter 123.

The low pass filter server to remove all frequencies above a specific frequency, with little effect below this point. The specific frequency is selected by a contact set on switch 41 which switches capacitor 152 in parallel with capacitor 150 for 30 hertz (play mode), or disconnects capacitor 152 for 350 hertz (fast forward mode). The signal emanating from the emitter of transistor 123 contains only those components below the specific frequency.

The network consisting of resistor 126, diode 160 and capacitor 154 serves to convert the audio frequency signal from transistor 123 to a DC voltage which acts upon the bias of transistor 125. When no signal is present, transistor 125 is on through the bias provided by resistor 127, thus the voltage at the collector is essentially zero. A signal from transistor 123 is rectified by diode 160 and, being an anti-phase with the voltage stored in capacitor 154, tends to lower the net bias to the base of transistor 125. Assuming the signal to be of specified amplitude, the net affect is a complete reduction of bias to transistor 125.

The reduction of bias to transistor 125 occurs immediately with the presence of an input signal. Since noise components could very easily trigger the remaining circuitry causing false operation, a time constant circuit is connected to the collector of transistor 125, offering about 0.1 second delay.

Removal of bias from transistor 125 allows the collector current to subside and capacitor 155 to begin charging toward the power supply potential through resistor 128, and to some extent resistor 129 through diode 157. This rise in potential reaches a point where the trigger circuit, consisting of transistor 130 and transistor 132 changes state, turning resistor 138 on which, in turn, energizes relay 169. This condition will continue so long as the proper signal is applied to contact 162. When the input signal subsides, transistor 125 turns on immediately and quickly discharges capacitor 155. The trigger returns to its normal state and relay 169 deenergizes.

Relay 169 serves to apply a momentary power pulse to the pawl solenoid 51. In the de-energized position, the storage capacitor 156 is connected to the −6 volts supply through resistor 141, and quickly charges to that potential.

When relay 169 is energized, capacitor 156 is connected across solenoid 51 causing it to energize for about 25-30 milliseconds. This action in turn releases the latch pawl causing the mechanical mechanism to return to play mode. Even though relay 169 may remain energized, the energy stored on capacitor 156 is dissipated and cannot be replaced until relay 169 de-energizes, thus the mechanism is held in play mode.

When relay 169 is de-energized (no control signal present), the player may be set into fast forward by the action of contacts 52 and 53 of switch 41. This contact set closes point 145 to point 146 momentarily, allowing forward bias to be applied to the solenoid drivers, transistors 143 and 161. When the control knob is turned toward fast forward, and no 30 hertz signal is present, the net action is solenoid 51 being energized through tansistor 161 directly to the −6 volts supply. This releases the latch pawl and mechanical force applied to the control knob serves to engage fast forward mode.

Should the 30 hertz tone be present, relay 169 will be energized by transistor 138 being on. If the control knob were to be turned toward fast forward, again contacts 52 and 53 of switch 41 close, but such action will have no purpose in that point 145 is essentially at the same potential as the emitter reference for transistor 143 and transistor 161 owing to the fact that transistor 138 is on, placing −6 volts at point 145 through resistor 144. Thus, the solenoid driver transistor 161 cannot turn on, and fast forward mode is inhibited.

Figure 7:
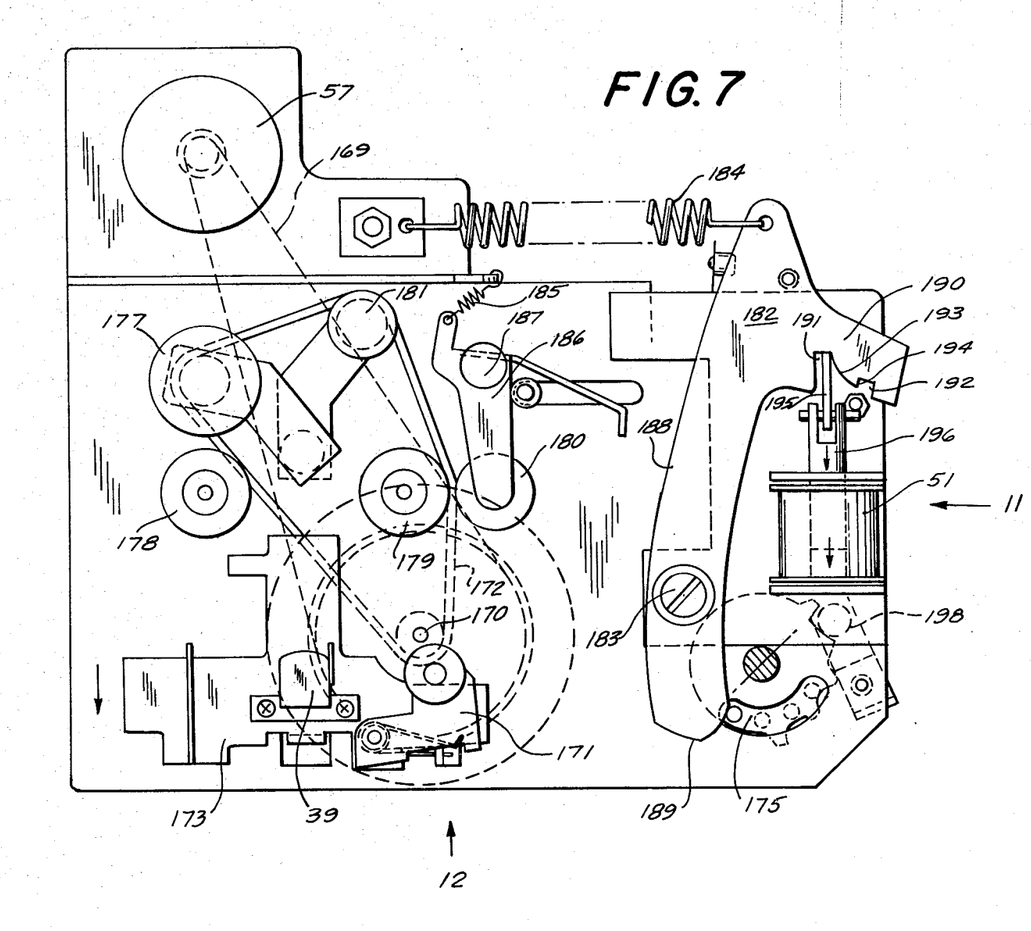
FIG. 7 is a top plan view thereof with the cover removed and showing the apparatus in fast forward operating condition.
Figure 8:
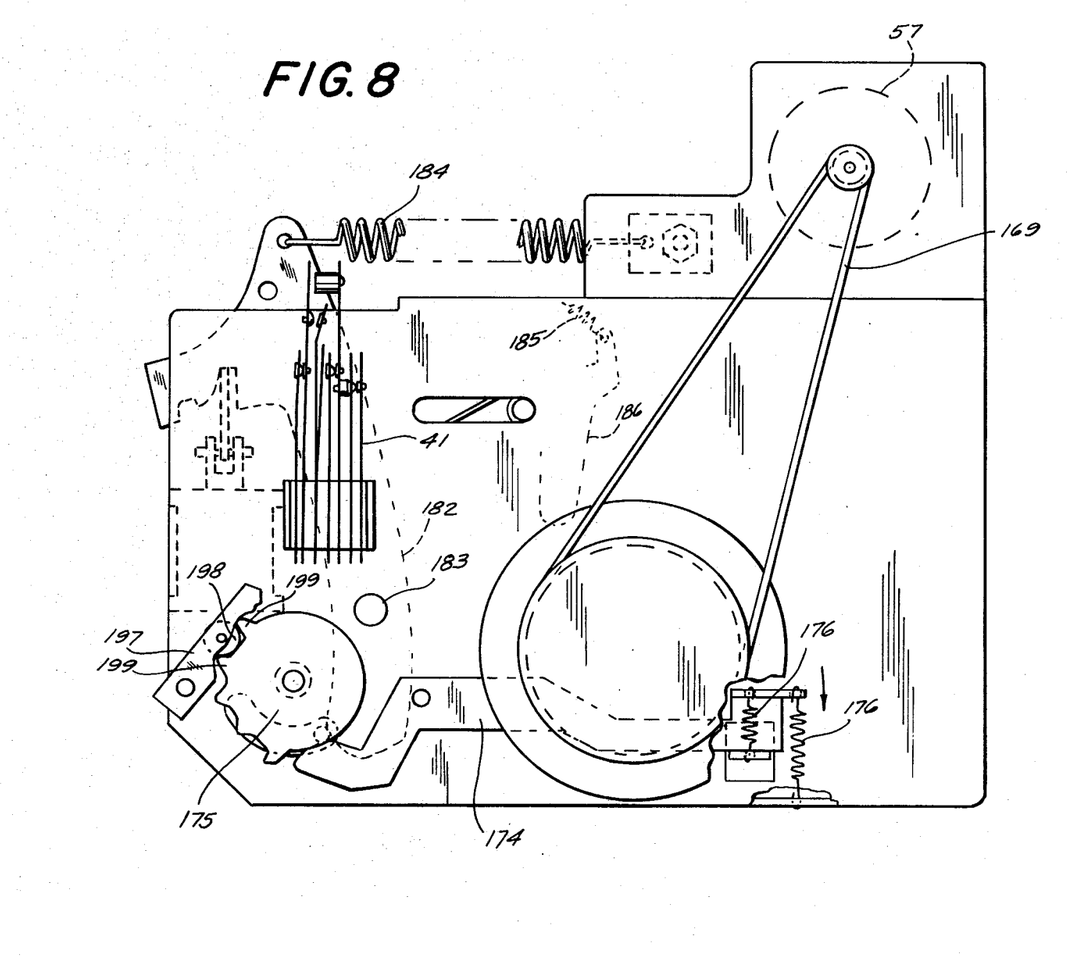
FIG. 8 is a bottom plan view thereof with the case removed showing the apparatus in fast forward operating condition.
Figure 9:
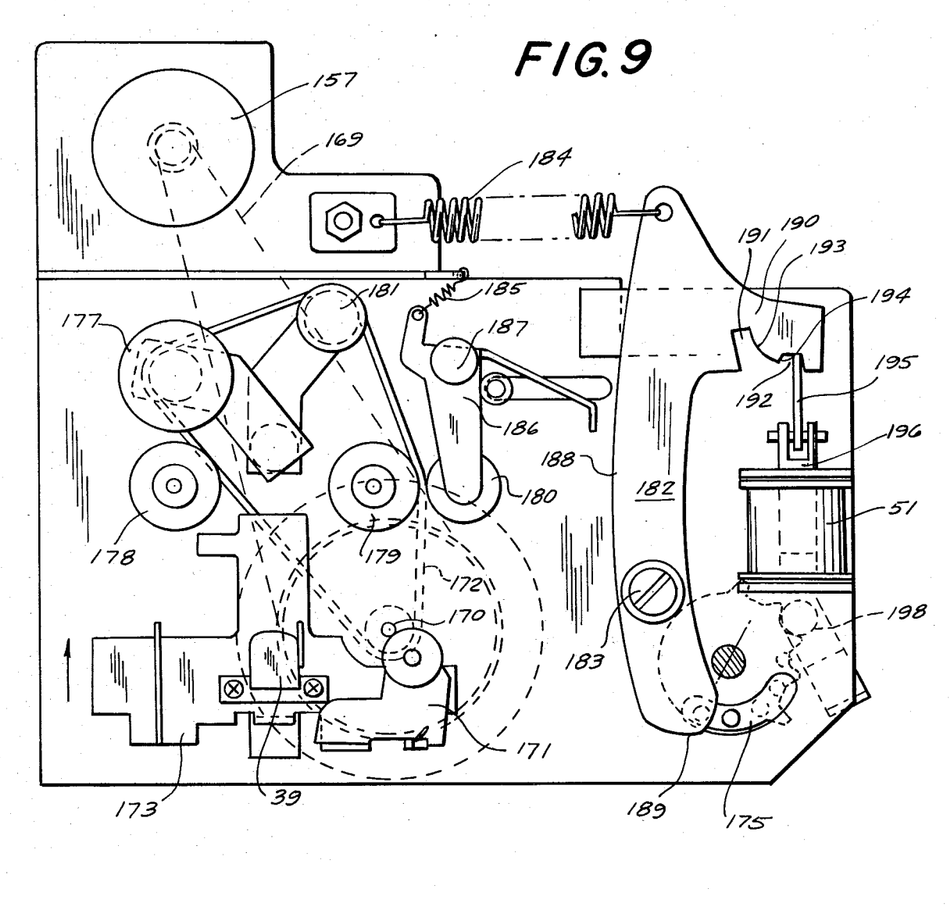
FIG. 9 is a top plan view thereof with the cover removed and showing the apparatus in normal play operating condition.
Figure 10:
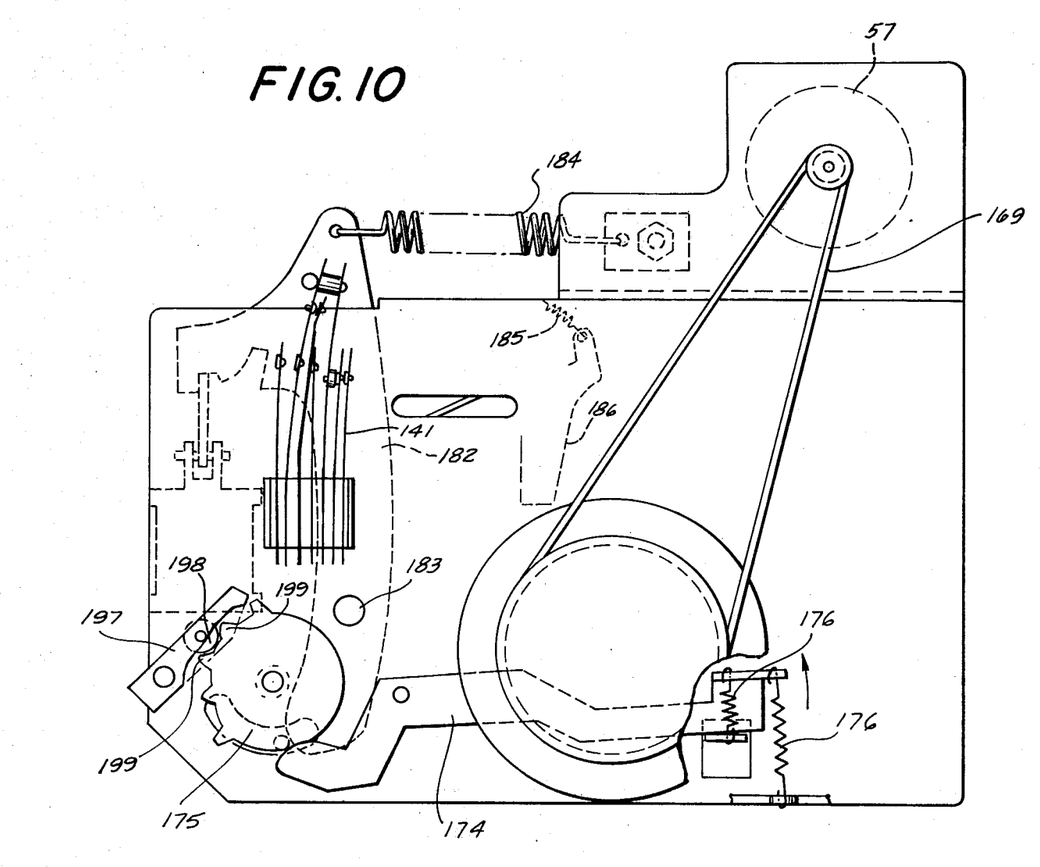
FIG. 10 is a bottom plan view thereof with the casing removed and showing the apparatus in normal play operating condition.
Figure 11:
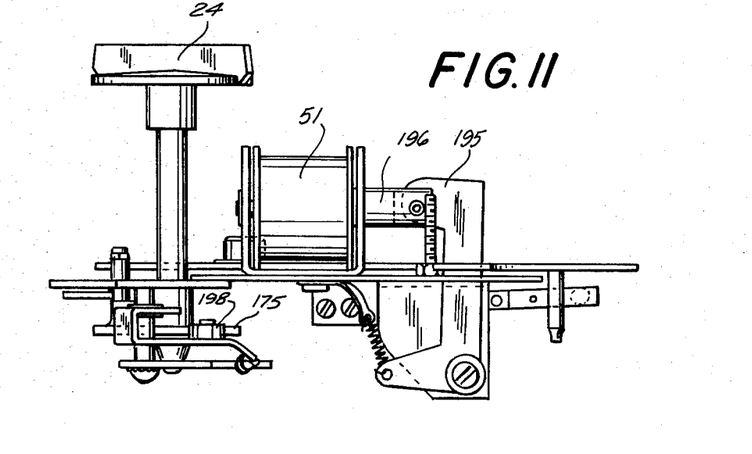
FIG. 11 is a fragmentary sectional view thereof taken along the plane of line 11—11 of FIG. 7.
Figure 12:
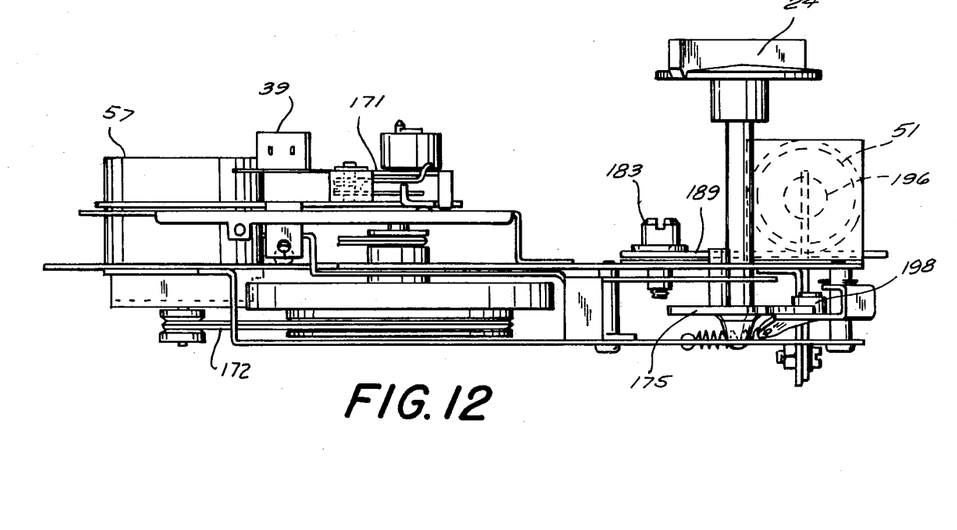
FIG. 12 is a fragmentary sectional view thereof taken along the plane of line 12—12 of FIG. 7.

FIGS. 7 and 8 show the apparatus 20 in the fast forward position and FIGS. 9 and 10 show the same apparatus in the play position. Considering the structure first in the fast forward position, motor 57 is connected by belt 169 to capstan drive assembly 170 which cooperates with pinch roller assembly 171 in guiding the tape 172 within the cassette into proper position for engagement with the head assembly 173 which contains the reproducing head and guide 39. A head plate control arm and spring assembly 174 is responsive to the control cam shaft 175 is positioning the head with respect to the tape. The position of the head will be determined by interconnected responsive movement between control cam shaft 175 at play control arm 174 and interconnected springs 176 which move the head into and out of the relative engagement positions discussed above with respect to tape 172. The tape is further guided by a variety of guide-posts 177-181 appropriately positioned within the casing. This arrangement is a conventional type of well known means for advancing and controlling the tape as it is being advanced for reproduction of the program thereon.

Unique in the tape control and advance mechanisms is the provision of the cam detent arm 182 which is pivotally mounted within the casing about point 183. A spring 184 attached at the upper apex of arm 182 and in turn attached to the casing tends to bias the cam and detent arm in a counter-clockwise direction. Arm 182 is prevented from rotation in that direction by interengagement with the control cam shaft 175. Knob 24 on the exterior of casing 21 is directly connected to control cam shaft 175 so that manual rotation into the fast forward position as shown in FIGS. 7 and 8 will permit arm 182 to be shifted to the fast forward position. As discussed above, appropriate electrical conditions within the apparatus will then permit the tape to be advanced at a faster speed. A mechanical interconnection with head plate control arm 174 will permit the head to be spring biased away from tight contact with the tape into light contact with the tape and permit fast advancement of the tape.

Roller 180 which engages the tape and guides it during travel is spring biased by means of spring 185 interconnected with arm assembly 186 which holds guide roller 180. Arm 186 is pivotable about point 187 so that the spring holds it into interengagement with the tape and helps to retain the tape against guide roller 179.

The locking detent arm 182 has a slightly arcuate main body portion 188 and is rotatably mounted about the shaft at pivot point 183 which is adjacent one end of the body portion 188. One tip 189 of the main body portion 188 is in engagement with an appropriate portion of control cam 175. Therefore, when an attempt is made to rotate control cam 175, it will engage with tip 189 and displace the cam arm about pivot 183. This action will occur when the control cam is rotated in one direction and accordingly arm 182 will be rotated so that a bias is placed on spring 184. Accordingly, when the control cam 175 is rotated in the opposite direction, spring 184 will be free to return the cam arm in the opposite direction. At the upper end of cam arm 182 is a lateral projection 190 which has a pair of notches 191 and 192 in one surface thereof. An arcuate cam surface 193 communicates between notches 191 and 192 and terminates in a shoulder 194 forming one side of notch 192.

Mounted in the casing of the apparatus is solenoid 51. The solenoid is positioned so that the pawl or latch dog 195 extending from solenoid arm 196 can be positioned within notch 191 or notch 192 depending upon the operation of the mechanism. When arm 196 of solenoid 51 is retracted, the pawl 195 will be removed from notches 191 and 192 allowing free movement of arm 182.

Switch 41 is shown mounted in FIG. 8 in the casing and on arm 182 so that movement of the arm will cause certain electrical contacts to be made and in turn electrical signals changing the contacts will cause movement of the arm as described in detail above.

An appropriate spring loaded lock arm 197 is mounted in the casing and positioned so that lock wheel 198 can be spring biased into position between a pair of adjacent projections 199. The series of projections 199 are positioned around the outer surface of control cam 175 so that each of the positions of operation of the apparatus as determined by knob 24 can be achieved. Rotation of knob 24 will cause simultaneous rotation of control cam 175 between the fast forward, play, stop and rewind positions. In each position the lock wheel 190 will be spring biased between a pair of adjacent projections 199 to achieve a positive position of operation. It can be seen how a projection 199 will act as a cam against the head plate control arm 174 when the apparatus is shifted to the fast forward position so that the head engagement with the tape can be properly adjusted. As discussed above, springs 176 assist in movement of head plate control arm in an appropriate manner for head interengagement with the tape.

In the position shown in FIGS. 7 and 8, electrical conditions are such that there is no 30 hertz signal and consequently the cam detent arm has been shifted by rotation of control cam 175 into the fast forward position permitting the proper electrical contacts to be made to rotate the tape at a fast forward speed.

When a control signal is received, electrical conditions will force the control cam 175 and cam detent arm 182 into the normal play position.6During this action, latch pawl 195 will shift along cam surface 193 and snap into latch 192 in the play position as shown in FIGS. 9 and 10. It will be noted that when the pawl 195 is in the extended position it is not possible to return the control cam 175 and cam detent arm 182 to the fast forward condition. The system must remain in the play position as shown since pawl 195 is blocked from movement in the opposite direction by shoulder 194.

When the proper electrical conditions have been reached within the system as discussed in detail above, solenoid arm 196 and the attached pawl will be withdrawn from notch 192 and movement to the fast forward position will be permitted. As pointed out, this will occur when the program is in the non-abstract portion of the presentation. At that time, there will be no 30 hertz control signal present and pawl 195 will be retracted permitting shifting to the fast forward condition by rotating cam 175 and pivoting arm 182. As soon as a 30 hertz signal is received, the electrical system as described will shift the control cam and arm 182 into the play position automatically and will appropriate latch pawl 195 in notch 192. As long as the control signal is present, shoulder 194 will prevent shifting to the fast forward position.

Thus, the above discussed objectives of the present invention are effectively attained.

We claim:

1. An automatic cassette reproducing apparatus for use with a cassette tape with an audio program and a control signal thereon comprising:
 a housing adapted to receive said cassette;

cassette tape transport means within said housing for engagement with and transportation of said tape;

said transport means in a first mode adapted to advance the tape at a normal speed at which the audio program thereon can be transmitted to a listener and adapted to be shifted to a second mode to advance the tape at a faster speed to a later portion of the audio program;

lock means on the housing to automatically retain the transport means in one of said modes for a predetermined length of time;

control means in the housing to automatically activate and deactivate the lock means in response to the control signal on the tape;

the lock means including a locking arm pivotally mounted in the housing;

a pair of adjacent notches in the locking arm;

a portion of the locking arm in engagement with a rotatable switch electrically connected so that shifting of the switch between alternate positions will alter the speed at which the tape is transported;

a solenoid mounted in the housing adjacent to the locking arm and having a latch pawl extending therefrom so as to be shiftable by action of the solenoid arm between a forward and a retracted position and in the forward position being extendable into an aligned notch of the locking arm;

a shoulder located between the two adjacent notches in the locking arm so that when the solenoid is activated to advance the latch dog into one of the notches in the locking arm and arm will be restricted in rotational movement thereby restricting movement of the rotatably control knob and retaining the apparatus in one of the two modes and when the latch pawl is retracted by action of the solenoid the latch pawl will be withdrawn from the notches in the locking arm and the locking arm will be free to be shifted between the two speed modes.

2. An automatic cassette reproducing apparatus for use with a cassette tape with an audio program and a control signal thereon comprising:

a housing adapted to receive said cassette;

cassette tape transport means within said housing for engagement with and transportation of said tape;

said transport means in a first mode adapted to advance the tape at a normal speed at which the audio program thereon can be transmitted to a listener and adapted to be shifted to a second mode to advance the tape at a faster speed to a later portion of the audio program while permitting continuous advancement of the tape by the transport means;

lock means on the housing to automatically retain the transport means in one of said modes for a predetermined length of time;

control means in the housing to automatically activate and deactivate the lock means in response to the control signal on the tape without affecting continuous advancement of the tape;

the lock means retaining the transport means in the first mode for a designated portion of the audio program; and the control signal being inaudible and appearing intermittently on the tape to activate the lock means and retain the transport means in the first mode for predetermined periods of time during which the transport means cannot be shifted from the first mode.

3. The invention in accordance with claim 2 wherein there is a manual switch adapted to shift the transport means between the first and second modes when the lock means is deactivated.

4. The invention in accordance with claim 2 wherein there is an audible signal on the tape to denote the end of each control signal interval thereby indicating deactivation of the lock means and permitting the transport means to be shifted to the second mode.

5. A method of inhibiting the presentation of an audio program on a tape cassette utilized on automatic cassette reproducing apparatus comprising:

providing the tape with an audio program and a control signal thereon at designated intervals corresponding to particular portions of the audio program;

automatically locking the reproducing apparatus at a normal play speed in response to location of the control signal and preventing advancement at a faster speed during a period of time the reproducing apparatus is locked while permitting the continuous advancement of the tape;

permitting the rapid advancement of the program as desired by the reproducing apparatus when the apparatus is not locked until the location of the control signal again causes the apparatus to be locked at the normal play speed;

providing an inaudible control signal corresponding to designated intervals of particular portions of the audio program;

automatically locking the apparatus at the normal play speed during the designated intervals of the program and not permitting the apparatus to advance at a faster speed while the inaudible control system is present without affecting continuous advancement of the tape; and permitting the remaining portions of the program to be advanced at normal play speed or at a faster speed as desired in the absence of a control signal.

6. The invention in accordance with claim 5 wherein a manual switch is provided to permit shifting between a normal play speed and a rapid advance speed as desired in the absence of a control signal.

7. The invention in accordance with claim 5 wherein there is an indicator audible signal which designates the end of the control signal interval.

* * * * *

UNITED STATES PATENT OFFICE
CERTIFICATE OF CORRECTION

Patent No. 4,048,659             Dated September 13, 1977

Inventor(s) August A. Fink, Jr. et al.

It is certified that error appears in the above-identified patent and that said Letters Patent are hereby corrected as shown below:

Col. 7, line 61, the number "144" should read --114--.

Col. 8, line 11, the word "from" should read --for--.

Col. 8, line 46, after the word "embodiment" the word --shown-- should be inserted.

Col. 8, line 57, the letters "te" should read --the--.

Col. 10, line 42, the word "on" should read --in--.

Col. 11, line 8, the word "is" should read --in--

Col. 12, line 19, the number "190" should read --198--.

Col. 12, line 37, before the word "During" the number "6" should be deleted.

Col. 13, line 32, the word "and" should read --the--

Col. 13, line 34, the word "rotatably" should read --rotatable--.

Signed and Sealed this

Fourteenth Day of March 1978

[SEAL]

Attest:

RUTH C. MASON
Attesting Officer

LUTRELLE F. PARKER
Acting Commissioner of Patents and Trademarks